US008306535B2

(12) United States Patent
Masuda et al.

(10) Patent No.: US 8,306,535 B2
(45) Date of Patent: Nov. 6, 2012

(54) COMMUNICATION CONTROLLER AND COMMUNICATION CONTROLLING METHOD FOR CONTROLLING A MOVABLE COMMUNICATION TERMINAL DEVICE

(75) Inventors: Masafumi Masuda, Yokosuka (JP);
Yasuhiro Kawabe, Yokosuka (JP);
Takaaki Sato, Kawasaki (JP);
Katsuhiko Yamagata, Fujisawa (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 541 days.

(21) Appl. No.: 12/515,106

(22) PCT Filed: Nov. 16, 2007

(86) PCT No.: PCT/JP2007/072295
§ 371 (c)(1),
(2), (4) Date: May 15, 2009

(87) PCT Pub. No.: WO2008/059964
PCT Pub. Date: May 22, 2008

(65) Prior Publication Data
US 2010/0291916 A1 Nov. 18, 2010

(30) Foreign Application Priority Data
Nov. 16, 2006 (JP) ................... 2006-310087

(51) Int. Cl.
*H04W 4/00* (2009.01)
*H04W 36/00* (2009.01)
(52) U.S. Cl. ............... 455/435.2; 455/436; 370/331
(58) Field of Classification Search .......... 455/422.1, 455/432.1, 432.3, 433, 435.1, 435.2, 436; 370/331
See application file for complete search history.

(56) References Cited

U.S. PATENT DOCUMENTS
6,377,804 B1 * 4/2002 Lintulampi ............... 455/435.2

2004/0017798 A1 * 1/2004 Hurtta et al. .............. 370/352
(Continued)

FOREIGN PATENT DOCUMENTS
JP 2002-505055 A 2/2002
(Continued)

OTHER PUBLICATIONS

3rd Generation Partnership Project; Technical Specification Group Radio Access Network; IP transport in UTRAN (Release 5), "3GPP TR 25.933", V5.4.0 (Dec. 2003), pp. 1-138.

(Continued)

*Primary Examiner* — Christopher M Brandt
(74) *Attorney, Agent, or Firm* — Crowell & Moring LLP (57) ABSTRACT

A communication controller and a communication controlling method are provided, even when functionalities of the communication controller included in a communication system such as UTRAN or the like, so that the services of the functionalities are available broadly in the whole system. An RNC 102 for controlling a movable communication terminal device, in cooperation with the communication controller, receives a request for provision of a service. The RNC 102 includes: a signal transmitter/receiver 201 for discriminating the type of the requested service; an HSUPA communication request discriminating section 203; a call controller 202; a transfer destination search table 205 for storing information that associates a service that can be requested by the service request receiving means and another RNC that can provide the service; and a transfer destination searching section 204 for identifying another RNC that can provide the service, based upon the information stored in the transfer destination search table 205, if there is a request for HSUPA communication that cannot be provided by the RNC 102. The RNC 102 transfers the request for the provision of the service to another RNC identified by the transfer destination searching section 204.

4 Claims, 7 Drawing Sheets

U.S. PATENT DOCUMENTS

| | | | |
|---|---|---|---|
| 2004/0196870 A1 | 10/2004 | Cheng et al. | |
| 2005/0059397 A1* | 3/2005 | Zhao | 455/435.2 |
| 2005/0239463 A1* | 10/2005 | Lagnado | 455/435.2 |
| 2005/0249121 A1 | 11/2005 | Matsunaga | |
| 2005/0249188 A1* | 11/2005 | Hayashi | 370/349 |
| 2006/0172735 A1* | 8/2006 | Buckley et al. | 455/434 |
| 2007/0224988 A1* | 9/2007 | Shaheen | 455/436 |

FOREIGN PATENT DOCUMENTS

| | | |
|---|---|---|
| JP | 2003-526294 A | 9/2003 |
| JP | 2003-319454 A | 11/2003 |
| JP | 2003-338832 A | 11/2003 |
| JP | 2004-312739 A | 11/2004 |
| JP | 2005-72656 A | 3/2005 |

OTHER PUBLICATIONS

3rd Generation Partnership Project; Technical Specification Group Services and System Aspects; Technical Specifications and Technical Reports for a UTRAN-based 3GPP system (Release 1999), "3GPP TS 21.101", V3.17.0 (Dec. 2007), pp. 1-16.

PCT/JP2007/072295 PCT/ISA/210 International Search Report w/English Translation.

Translation of PCT/JP2007/072295 PCT/ISA/237.

Japanese Office Action (w/translation), dated Nov. 15, 2011, 6 pages total.

* cited by examiner

| RNC ID | AVAILABLE/ /NOT AVAILABLE OF HSUPA | HEALTH CHECK INFORMATION | LOCATION NUMBER INFORMATION | DESTINATION INFORMATION |
|---|---|---|---|---|
| 0×01 | 0×01:AVAILABLE | OK:0×01 | 0×01 0×02 | 140.252.13.35 |
| 0×02 | 0×00:NOT AVAILABLE | OK:0×01 | 0×0C | 140.252.13.36 |
| 0×03 | 0×01:AVAILABLE | OK:0×01 | 0×0C | 140.252.13.37 |
| ... | ... | ... | ... | ... |
| 0×10 | 0×01:AVAILABLE | NG:0×00 | 0×0F 0×10 | 140.252.13.50 |

PRIOR ART

US 8,306,535 B2

COMMUNICATION CONTROLLER AND COMMUNICATION CONTROLLING METHOD FOR CONTROLLING A MOVABLE COMMUNICATION TERMINAL DEVICE

TECHNICAL FIELD

The present invention relates to communication controllers and communication controlling method, and more specifically, to a communication controller and a communication controlling method for communication by use of a subscriber line extension method.

BACKGROUND ART

These days, various types of communication controllers are proposed in order to control communication of movable communication terminal devices such as mobile telephones and the like. In such a communication controller, a communication system of global standard such as W-CDMA (Wide band Code Division Multiple Access) or UMTS (Universal Mobile Telecommunications System) is applied. According to the above communication system, a single frequency bandwidth is shared by multiple users by multiplexing codes, whereby the frequency efficiency is excellent and high-speed communication is made available in a flexible manner by selecting the code. The conventional technique for the above communication system is described in Non-Patent Document 1.

A general W-CDMA system will now be described with reference to FIG. 8. In the system as shown, UE (User Equipment) 1 is managed by a base transceiver station NodeB 02. The NodeB 02 is controlled by an RNC (Radio Network controller) 02. The RNC 02 is managed by an MSC/SGSN (Mobile Switching Center/Serving GPRS Support Node) 5.

The MSC/SGSN 5 also manages an RNC 01 as well as the RNC 02. A node controlled by the RNC 01 is indicated by Node 01.

The unit of a radio network including the RNC and the NodeB under the RNC is referred to as RNS (Radio Network Subsystem). In the drawing, the RNC 01 and the RNC 02 are shown and included in an RNS 01 and an RNS 02, respectively. In addition, the network including the MSC/SGSN 5 is referred to as a CN (core Network) 8. Furthermore, the whole system on the radio network side is referred to as UTRAN (UMTS terrestrial radio access network).

Meanwhile, Uu represents the interface between the UE 1 and the UTRAN, Iur represents the interface between the RNC 01 and the RNC 02, and Iu represents the interface between the UTRAN and the CN.

In a UTRAN, when the UE 1 moves while maintaining communication, an RNC 3 that controls calling of the UE 1 is fixed as an S-RNC (Serving-RNC), allowing the S-RNC to remotely control an RNC, namely D-RNC (Drift-RNC) that manages a cell where the UE 1 exists (also represented as existing in a cell, which denotes existing in a communication area). Such a technique is herein referred to as subscriber line extension method.

An RNC, to which a connection request is given at the start of communication, serves as an S-RNC. The S-RNC is not changed by the movement of the UE 1, as long as the subscriber line extension method is continuously employed. However, the S-RNC may be changed in the middle of communication by an S-RNC Relocation.

Non-Patent Document 1: 3GPP Technical Standard TS 21.101
Non-Patent Document 2: 3GPP Technical Report TR 25.933

DISCLOSURE OF THE INVENTION

Problems to be Solved by the Invention

Incidentally, in many case, the W-CDMA system includes multiple RNCs. The RNCs included in the system do not always have the same functionality, but often have some variations. Examples of the aforementioned functionality can be a call control function relating to HSPDA (High Speed Downlink Packet Access) or HSUPA (High Speed Uplink Packet Access), and a Iub frame protocol terminating function relating thereto.

HSDPA and HSUPA are communication functionalities and specified in Release 5 and Release 6, respectively, of 3GGP. The user throughputs on the uplink and downlink communications in the W-CDMA system are improved, and in addition, there are other effects of improving the sector throughput and suppressing the delay.

It should be noted, however, that such functionalities are optionally upgraded ones in the early stage of the W-CDMA, also known as Release 99 (R99). Therefore, if a telecommunications carrier partially upgrades only the RNC included in a system and uses the upgraded RNC together with a non-upgraded RNC, there will be variations in the functionality of the RNC as a Serving-RNC. The non-upgraded RNC establishes communication by means of an R99 line with the use of a capability of lower compatibility (backward compatibility).

Such a system with variations in the RNC functionality causes a drawback, regardless of the provision of the upgraded RNC, in that a mobile telephone managed by a base transceiver station controlled by a non-upgraded RNC cannot get services of the functionalities of HSPDA or the like.

Figure 8:
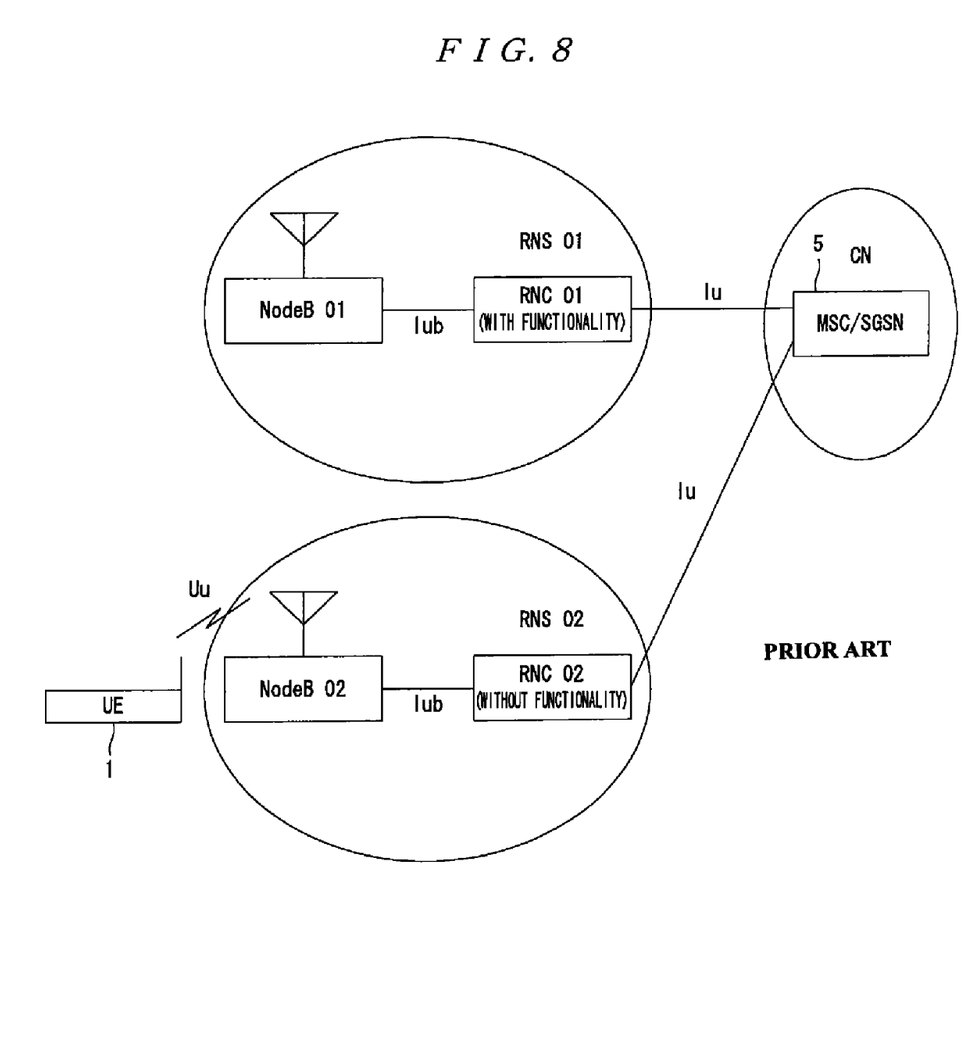
FIG. 8 is a view illustrative of a general W-CDMA system.

For instance, in an example of FIG. 8, it is assumed that the RNC 01 should be provided with a call control function of HSUPA, whereas the RNC 02 should not be provided with the call control function of HSUPA. In this assumption, since the RNC 02 that has received a connection request (RRC Connection Request) via the NodeB 02 is not provided with the HSUPA functionality, the RNC 02 reads information on the HSUPA communication request included in the connection request message but abandons the information so as to implement the R99 line settings.

In such a conventional technique, the functionality of the RNC that serves as an S-RNC determines whether or not the functionality of HSDPA or HSUPA is available. Accordingly, even if the RNC is partially upgraded in the W-CDMA system, the variations in the RNC functionality will not permit the whole system to make use (broad use) of the upgraded services.

The present invention has been made in view of the above circumstances, and provides a communication controller and a communication controlling method for, whereby even if the functionalities of the communication controllers included in a communication system such as a UTRAN or the like have variations, services of the d Functionalities are available broadly in the whole system.

Means for Solving The Problems

In order to solve the above problem, according to an aspect of the present invention, there is provided a communication controller, that operates in cooperation with another communication controller and that controls a movable communication terminal device, the communication controller comprising: service request receiving means for receiving a request for provision of a service via communication with another device, and discriminating whether or not the communication controller has functionality of providing the requested service; service providing device information storing means for storing information that associates a service that can be requested by the service request receiving means and another communication controller that can provide the service; service available device identifying means for, if the service request receiving means discriminates that the communication controller does not include the functionality of providing the requested service, identifying another communication controller that can provide the service, based upon the information stored in the service providing device information storing means; and request transferring means for determining said another communication controller that has been identified by the service available device identifying means to be a transfer destination of the request for the provision of the service that has been received by the service request receiving means. In the above configuration, if a service that can be provided by the communication controller, another communication controller that is capable of providing the requested service can be identified, based upon information associating a service that can be requested and another communication controller that is capable of providing the service. In addition, the service request receiving means is capable of transferring the request for the provision of the service that has been received by the service request receiving means, thereby allowing the functionality of another communication controller to provide even the service that cannot be provided by the communication controller.

In addition, in the above communication controller described when an instruction of receiving a call for the provision of the service to be controlled by a network side is given to a plurality of communication controllers in a communication range where the communication controller exist, the transferring means may transfer the request for the provision of the service to another communication controller that controls an incoming-call call up area identical to that of the communication controller out of the plurality of the communication controllers.

In the above configuration, when the communication controller provides a service in response to an instruction from an upper controller, the upper controller is prevented from receiving a response to a signal from the communication controller that has not given an instruction. It is therefore possible to prevent the communication control in the controller from being confused.

Furthermore, in the above communication controller, when the communication controller makes the request for the provision of the service to the service request receiving means by requesting start of the communication, the service request receiving means may discriminate a type of the service that has been requested, based upon information included in a signal that requests the start of the communication. In the above configuration, a communication start request is processed and the requested service is discriminated simultaneously, thereby allowing the start of operation for providing the service immediately.

Moreover, the above communication controller, may further comprise at least one of the communication terminal device and said another communication controller, to be controlled by the communication controller based upon information that identifies said another communication controller included in the transferred request, when the request for the provision of the service is transferred from said another communication controller; and call setting means for setting a call in a communication line with which the requested service is provided. In the above configuration, call settings of a communication line for providing the service requested for another communication controller can be performed without transferring a great amount of data needed for the call settings to another communication controller from the communication controller serving as an S-RNC.

Moreover, according to another aspect of the present invention, there is provided a communication controlling method, to be performed by a communication controller that operates in cooperation with another communication controller and that controls a movable communication terminal device, the communication controlling method comprising: receiving a request for provision of a service via communication with another device, and discriminating whether or not the communication controller has functionality of providing the requested service; storing information that associates a service that can be requested by the receiving and another communication controller that can provide the service; identifying, if the receiving discriminates that the communication controller does not include the functionality of providing the requested service, another communication controller that can provide the service, based upon the information stored in the storing; and determining said another communication controller that has been identified to be a transfer destination of the request for the provision of the service that has been received. In the above configuration, if a service that can be provided by the communication controller, another communication controller that is capable of providing the requested service can be identified, based upon information associating a service that can be requested and another communication controller that is capable of providing the service. In addition, the service that has been received by the service request receiving step can be transferred, thereby allowing the functionality of another communication controller to provide even the service that cannot be provided by the communication controller.

As described above, according to an aspect of the present invention, even in a case where there are variations in the functionality of a communication controller included in a communication system such as UTRAN, it is possible to provide a communication controller and a communication controlling method, whereby the service provided by the functionality is broadly available to the entire of the system.

EXPLANATION OF REFERENCES

101 MSC/SGSN
102, 103 RNC
104, 105 NodeB
106 mobile telephone
201 signal transmitter/receiver
202 call controller
203 HSUPA communication request discriminating section
204 transfer destination searching section 205 transfer destination search table
304 destination information in NASAP transfer massage, extracting section

BEST MODE FOR CARRYING OUT THE INVENTION

An embodiment of the present invention will now be described with reference to the accompanying drawings.
(System Configuration)

Figure 1:
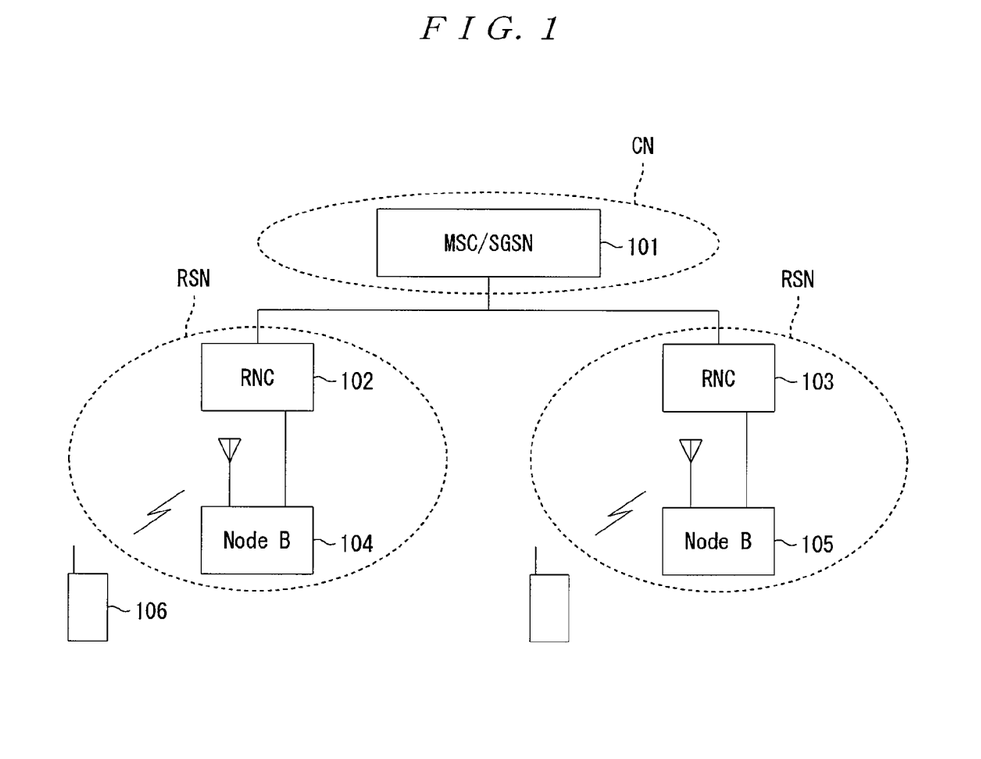
FIG. 1 is a view illustrative of a W-CDMA communication system according to an aspect of the present invention.

FIG. 1 is a view illustrative of a W-CDMA communication system according to the present embodiment. The W-CDMA communication system, as illustrated, has a similar configuration to the system that has been substantially discussed in the conventional technique.

The illustrated system includes: a mobile telephone 106 serving as US (User Equipment); a UTRAN (UMTS terrestrial radio access network) with which the mobile telephone 106 communicates; and a CN including an MSC/SGSN (Mobile Switching Center/Serving GPRS Support Node) 101.

The UTRAN includes: an RSN (Radio Network sub system) having an RNC (Radio Network Controller) 102 and a NodeB 104; and an RSN having an RNC 103 and a NodeB 105. The RNC 102 operates in cooperation with another RNC 103 so as to control the mobile telephone 106. The RNC 102 and the RNC 103 each correspond to a communication controller according to the present embodiment.

According to the present embodiment, it is assumed that the RNC 102 should not be provided with the functionality of HSUPA (High Speed Uplink Packet Access), whereas the RNC 103 should be provided with that of HSUPA. It is also assumed that the mobile telephone 106 make a request for start of HSUPA communication to the RNC 102 via the NodeB 104. It is further assumed that the RNC 102 that is not provided with the functionality of HSUPA transfer the request to the RNC 103, so the RNC 102 performs a call control for setting up an HSUPA line. The following description will be given with the above assumptions.

It is to be noted, however, that the present embodiment is not limited to making a request for an HSDPA service, and may be applicable to a case of making a request for another service. Moreover, in addition to the illustrated configuration, the W-CDMA system may include another RNC, multi-layered MSC/SGSNs, home memories for storing information on subscribers, and the like. Since such configurations are not directly related to the present embodiment, both of drawing and description thereof will be omitted for simplification.
(Configuration of Communication Controller)

Figure 2:
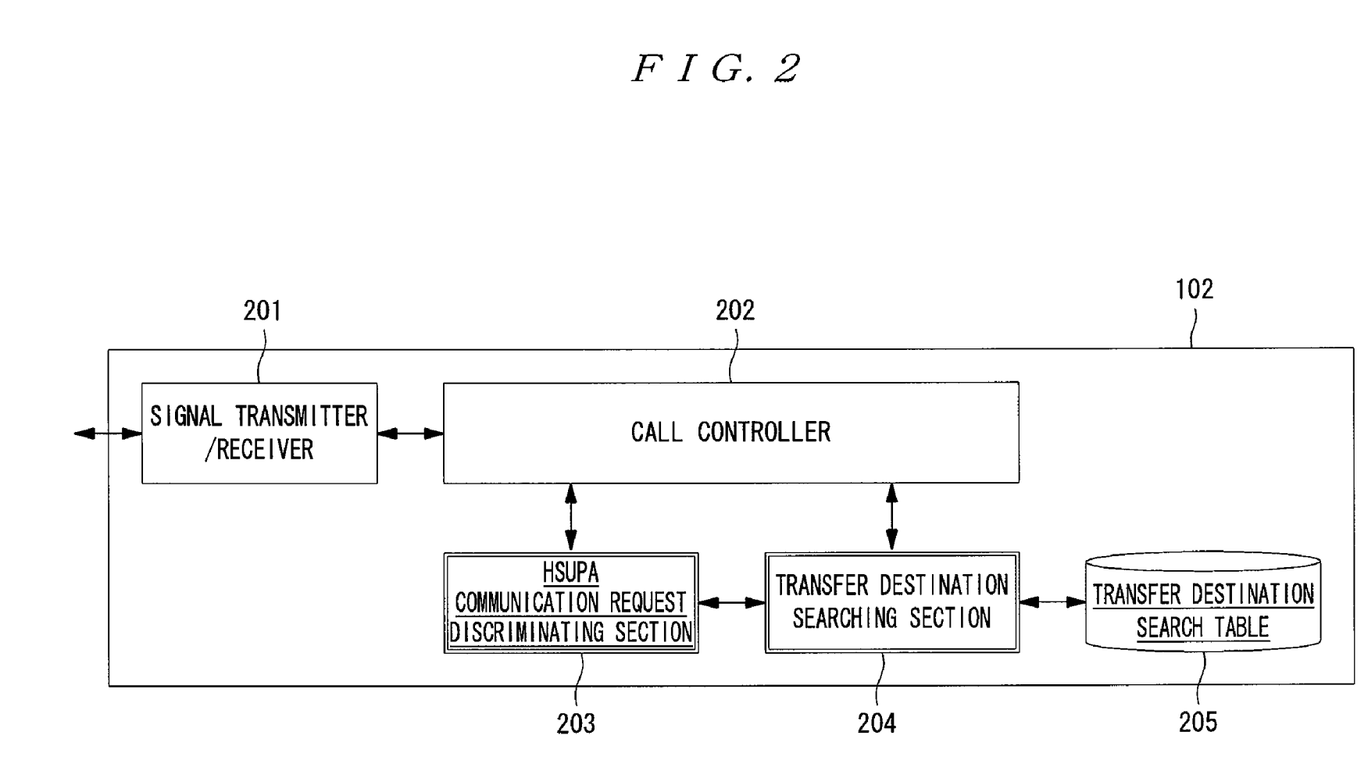
FIG. 2 is a functional block diagram illustrative of a configuration of an RNC of FIG. 1.

FIG. 2 is a functional block diagram illustrative of a configuration of the RNC 102 of FIG. 1. According to the present embodiment, the RNC 102 is provided with: a signal transmitter/receiver 201 for communicating with another device; an HSUPA communication request discriminating section 203 for receiving a request for provision of a service by way of communication and discriminating the type of the service; a transfer destination search table 205 for storing information associating each service that can be requested and an RNC that can provide the service; a transfer destination searching section 204 for identifying another RNC that can provide the requested service based upon the information stored in the transfer destination search table 205; and a call controller 202 for controlling the above components as a whole.

In the above configuration, the signal transmitter/receiver 201, the HSUPA communication request discriminating section 203, and the call controller 202 serve as service request receiving means. In addition, the transfer destination search table 205 serves as service providing device information storing means. The transfer destination searching section 204 and the call controller 202 serve as service available device identifying means. Further, the signal transmitter/receiver 201 serves as request transferring means for transferring the request of the received service to another RNC, which has been identified by the transfer destination searching section 204.

The signal transmitter/receiver 201 is an existing component for transmitting and receiving a message such as an RRC (Radio Resource Control) or an RNSAP (Radio Network Subsystem Application Part). The call controller 202 analyzes the message or manages communication resources, as with a general call controller.

When the mobile telephone 106 transmits a signal for making a request for provision of a service to the RNC 102 directly, the HSUPA communication request discriminating section 203 discriminates that the user of the mobile telephone 106 is making a request for HSUPA communication, based upon an HSUPA communication start request included in an RRC CONNECTION REQUEST message that has been received by the signal transmitter/receiver 201.

Figure 3:
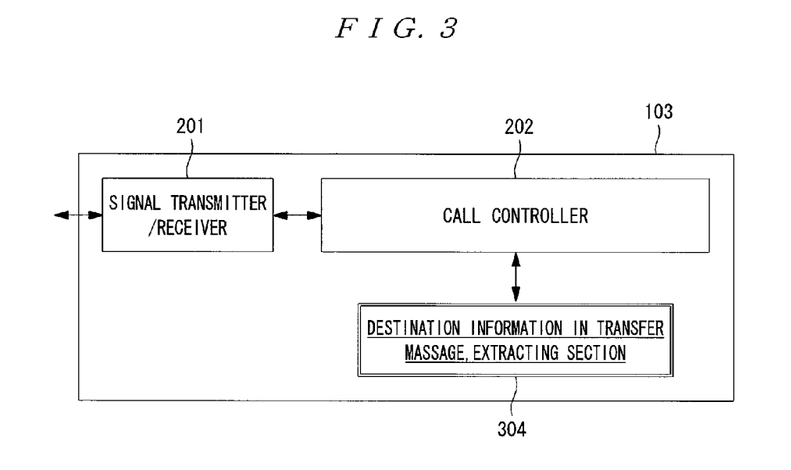
FIG. 3 is a functional block diagram illustrative of a configuration of another RNC, which is different from the RNC of FIG. 2 out of the RNCs of FIG. 1.

FIG. 3 is a functional block diagram illustrative of a configuration of the RNC 103 of FIG. 1. The RNC 103 is provided with the signal transmitter/receiver 201 and the call controller 202 as with the RNC 102. When the request for provision of a service is transferred from another RNC, the RNC 103 performs, based upon the information for identifying another RNC included in the transferred request, a call setting of a communication line, with which the requested service is provided, which is controlled by the aforementioned another RNC, and which includes at least the mobile telephone 106 and the aforementioned another RNC.

According to the present embodiment, it is assumed that an IP address of the RNC should be used as the information for identifying another RNC, so that destination information in RNSAP (Radio Network Subsystem Application Part) transfer massage, extracting section 304 should extract the IP address. The call setting on the communication line is performed by the call controller 202.

In the above description, in order to exhibit the difference in the operation between the RNC 102 and the RNC 103, only the configuration relating to the characteristic operations of the RNC 102 and the RNC 103 has been illustrated and discussed. However, the RNC 102 transfers the message of making a request for provision of a service to the RNC 103 according to the present embodiment, but the RNC 102 may receive the transferred message from another RNC. Alternatively, the RNC 103 may receive from the mobile telephone 106 a request for provision of a service that is not provided in the RNC 103.

Accordingly, it is assumed that the RNC 102 and the RNC 103 should be different in that only the RNC 103 is provided with the HSUPA functionality, and the RNC 102 and the RNC 103 should are configured in the same manner regarding other functionalities.

The operations for controlling the communication with the use of the above configuration will now be described with respect to origination of a call and reception of a call, separately.
(Originating Operation)

The control of originating operation will be described below, when the mobile telephone 106 makes a connection request to the RNC 102 directly and the RNC 102 voluntarily transfers the connection request.

When the mobile telephone 106 makes a request for start of HSUPA communication to the RNC 102, a connection request signal (RRC CONNECTION REQUEST) is transmitted to the RNC 102 from the mobile telephone 106. When the signal transmitter/receiver 201 of the RNC 102 receives the connection request signal, the call controller 202 analyzes the message. Then, the HSUPA communication request discriminating section 203 discriminates that the HSUPA communication request included in the message, namely the mobile telephone 106 makes a request for provision of the HSUPA communication service.

The result discriminated by the HSUPA communication request discriminating section 203 is transmitted to the call controller 202. The call controller 202 discriminates that the HSUPA communication functionality that have been requested are not provided therein. Then, the call controller 202 makes an instruction to the transfer destination searching section 204 to search for a transfer destination of the request. The transfer destination searching section 204 accesses the transfer destination search table 205 to search for an RNC, which is to be a transfer destination of the connection request signal.

Figure 4:
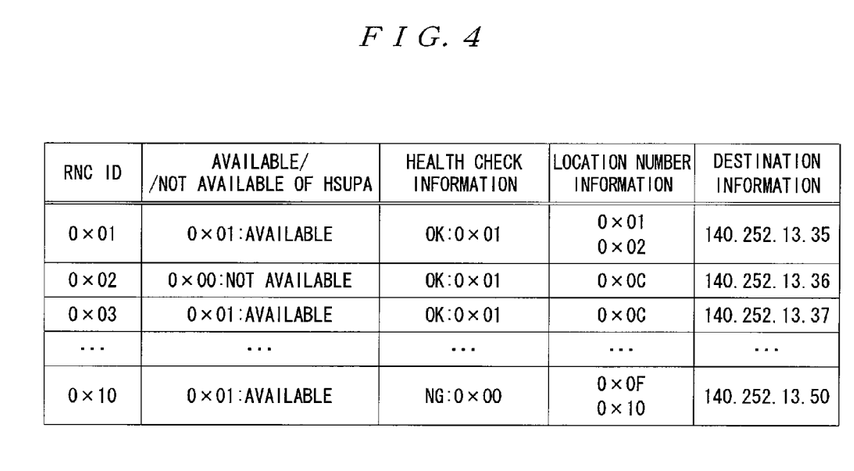
FIG. 4 is a view illustrative of a transfer destination search table of FIG. 2.

FIG. 4 is a view illustrative of the transfer destination search table 205. The transfer destination search table 205 retains an "RNC ID" for identifying each RNC, with respect to multiple RNCs managed by the MSC/SGSN 101. In association with the RNC IDs retained, there are "available/not available of HSUPA" indicating whether or not the HSUPA functionality is available, "location number information" identifying an area where each RNC registers the location of a communication terminal device and controls the communication thereof (corresponding to an incoming-call call up area according to the present embodiment and including multiple cells), and "destination information" for designating each RNC as a transfer destination (destination). It is assumed that the above information should be set in the transfer destination search table 205 beforehand by a system administrator.

In addition, according to the present embodiment, it is also assumed that "Health Check Information" should be recorded in the transfer destination search table 205 so as to discriminate whether or not the RNC is currently in a normally operable state. "Health Check Information" indicates the confirmation result of the state of each RNC by transmitting a Ping signal of ICMP (Internet Control Message Protocol) to each RNC. According to the present embodiment, the Ping signal is periodically transmitted, thereby allowing a dynamic change in the state of the RNC to be checked.

In the example illustrated in FIG. 4, if there is a normal response to the Ping signal, 0x01 is recorded as the "Health Check Information". If not, 0x00 is recorded as the "Health Check Information", indicating that the RNC is not capable of receiving the transfer of a signal because of a fault or the like. According to the present embodiment, this configuration is effective for preventing a trouble caused by a case where a connection request signal is transferred to a faulty RNC and an expected service cannot be provided.

The IP address of the RNC can be used for the "RNC ID". There is an advantage of implementing a subscriber line extension system by means of IP Transport in a general W-CDMA, by using the IP address as the address of the RNC.

According to the present embodiment, in some cases, there are multiple RNCs in an area to which a single piece of "location number information" is applied. To put in other words, the "location number information" is set for a single RNC only, in some cases, whereas identical "location number information" is set for multiple RNCs in other cases.

Moreover, only one piece of the location number information is set for each RNC in some cases, whereas multiple pieces of the location number information are set for each RNC in other cases. This is because some RNCs each have only one area where the communication of the mobile telephone 106 is managed and other RNCs each have multiple areas.

Incidentally, only whether or not the HSUPA functionality is available is set in the table of FIG. 4. The present embodiment is not limited to such a configuration, and the table may record multiple functionalities such as HSPDA functionality, multiple functionalities together with other functionalities and the like.

The transfer destination searching section 204 of the RNC 102 extracts RNCs with normal "Health Check Information" and the HSUPA functionality, as a result of search the transfer destination search table 205 of FIG. 4. Then, one RNC is randomly selected from the extracted RNCs. Alternatively, one RNC having an "RNC ID" greater than the "RNC ID", by 1, that was selected last time is selected (such a selection method is referred to as round robin).

Subsequently, the transfer destination searching section 204 detects "Destination Information" of the RNC having the "RNC ID" that has been selected as described above, from the transfer destination search table 205. The detected "Destination Information" is passed on to the call controller 202. The call controller 202 controls the signal transmitter/receiver 201 to transfer the connection request signal to the destination indicated by the "Destination Information".

Signaling in the transfer is achieved by, for example, defining an RNASP message dedicated for the RNASP protocol and encapsulating the connection request signal, namely RRC CONNECTION REQUEST, in the RNASP message. The call controller 202 is configured to include the destination information of the RNC (the RNC 102 according to the present embodiment), which is a transfer source of the RNASP message.

The RNC 103 to which the message has been transferred extracts the destination information of the RNC 103 from the RNASP message. Then, if the destination information extracted identifies the RNC 103 itself, an HSUPA line is set with the mobile telephone 106 by means of the subscriber line extension system. Consequently, the RNC 102 serves as an S-RNC so as to control data transfer rate, communication resource assignment, and operation parameters in the communication of the mobile telephone 106. Simultaneously with this control, the RNC 103 is made to serve as a D-RNC to provide the mobile telephone 106 with services by use of the HSUPA functionality of the RNC 103.

Figure 5:
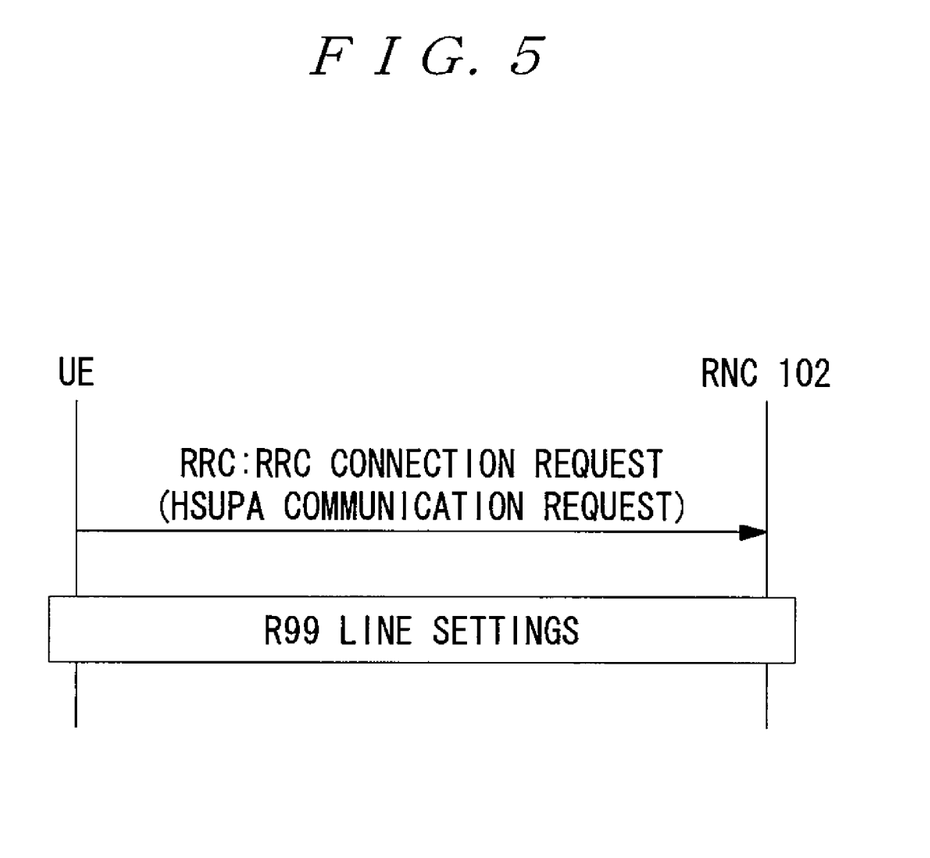
FIG. 5 is a view illustrative of the RNC of FIG. 2 setting an R99 line.

If the connection request signal transmitted by the mobile telephone 106 is not a HSUPA communication request or if the RNC to which the request is to be transferred cannot be identified, the RNC 102 sets an R99 line with the mobile telephone 106, as illustrated in FIG. 5.

Figure 6:
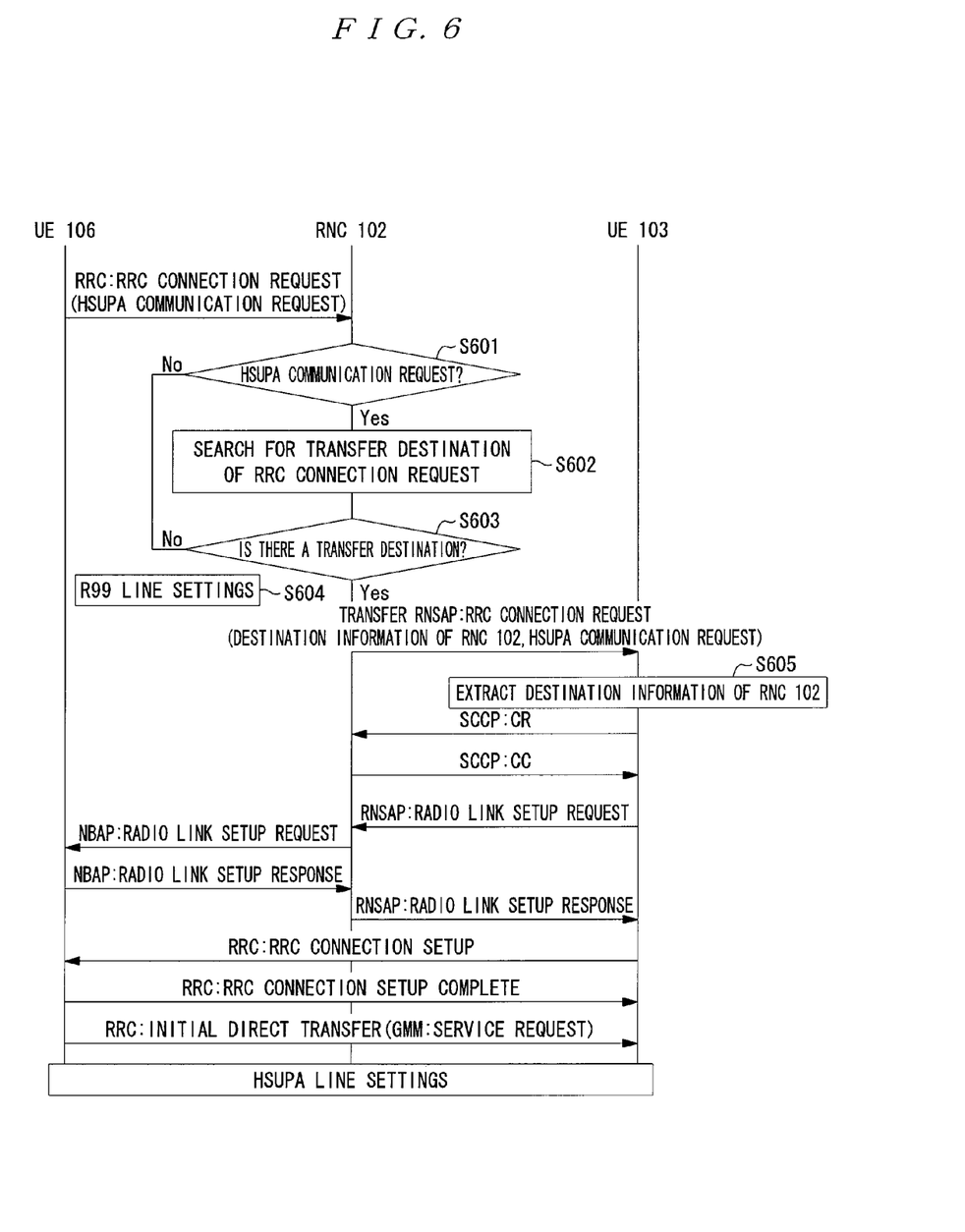
FIG. 6 is a timing chart for describing a communication controlling method to be performed by the RNC of FIG. 2.

FIG. 6 is a timing chart for describing a communication controlling method to be performed by the RNC 102 as described heretofore. As illustrated, the RNC 102, in receipt of a connection request from the mobile telephone 106, discriminates whether or not the request is a request for HSUPA communication (S601). As a result of the discrimination, if the request is not a request for HSUPA communication (S601: No), the RNC 102 sets up an R99 line with the mobile telephone 106 (S604).

At step S601, if the connection request is discriminated to be the request for HSUPA communication (S601: Yes), the RNC 102 searches for another RNC that is to be a transfer destination of the connection request, because the RNC 102 does not have the HSUPA functionality therein (S602). As a result of the search, if there is no RNC that is to be a transfer destination (S603: No), the RNC 102 sets up the R99 line with the mobile telephone 106 (S604).

If the RNC 103 is to be a transfer destination (S603: Yes), the RNC 102 transfers the connection request signal including the destination information of the RNC 102 that is a transfer source, to the RNC 103. The RNC 103 receives the transferred signal and extracts the destination information of the RNC 102 included in the signal (S605). Then, the RNC 103 transmits or receives an acknowledge signal representing the reception of the connection request, to or from the RNC 102, and transmits a request signal for setting up a line to the RNC 102.

The RNC 102 transmits a line-setting request signal to the mobile telephone 106 in receipt of the request signal, and receives its acknowledge signal. By transferring the received acknowledge signal to the RNC 103, the destination of the signal to be transmitted is identified so that the RNC 103 sets up the line, and is then transmitted to the mobile telephone 106. The mobile telephone 106 transmits back to the RNC 103 a completion signal indicating that the preparation for setting up the line with the RNC 103 has been completed. At this time, the mobile telephone 106 also transmits an INITIAL DIRECT TRABSFER simultaneously to confirm the state of data transfer.

The RNC 103, if data is transferred normally, sets up a HSUPA line with the mobile telephone 106 via the RNC 102.

Herein, in the above method, step S601 corresponds to a service request receiving step. Steps S702 and S703 correspond to a service available device identifying step. "PRC CONNECTION REQUEST transfer" to be implemented as a next step of step S603 correspond to a request transferring step.

(Receiving Operation)

Next, a description will be given of control of receiving operation, which initiates the operation of searching for an RNC that enables an HUSPA communication by means of the control on the CN side.

Figure 7:
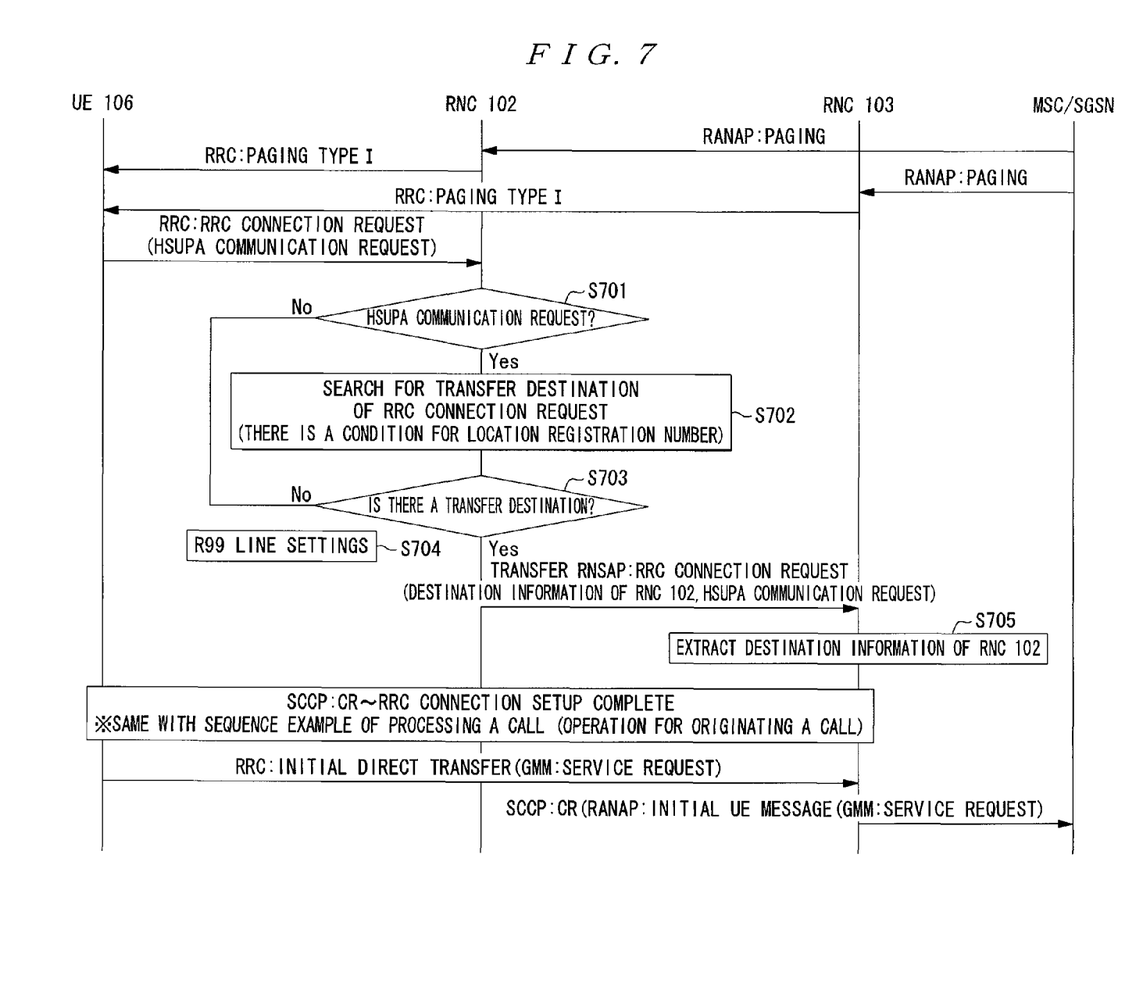
FIG. 7 is a timing chart for describing a communication controlling method for the RNC executing an operation for receiving a call.

The receiving operation is initiated by the RNC 102 receiving a PAGING signal that is a read-out signal from the MSC/SGSN 101. The MSC/SGSN 101 identifies the "location number information", and then transmits the PAGING signal. For this reason, the PAGING signal is transmitted to all RNCs having identical "location number information". According to the present embodiment, it is assumed that the RNC 102 and the RNC 103 have identical "location number information", so that the PAGING signal is transmitted to both of the RNC 102 and the RNC 103.

According to the present embodiment, it is assumed that the mobile telephone 106 should exist in an area under the control of the RNC 102. Therefore, the connection request signal from the mobile telephone 106 is received by the RNC 102. Subsequently, as with the originating operation, the RNC to which the connection request signal is to be transferred is searched for, so the connection request signal is transferred to the RNC that is to be a transfer destination.

It is to be noted, however, that in a case of the receiving operation, as conditions for selecting the RNC 102 that is an RNC to be a transfer destination, it is necessary for the RNC to have the "location number information" identical to that of a cell where the mobile telephone 106 exists, in addition to being available in "available/not available of HSUPA" and 0x01 of "Health Check Information".

Incidentally, the RNC stores the location number information of the area that is to be the transfer destination, so as to transmit the PAGING signal. Accordingly, when the connection request signal is received from the mobile telephone 106, it is easy to identify the location number of the cell where the connection request signal is received.

By adding the condition that the mobile telephone 106 has the location number information identical to that of the cell where the mobile telephone 106 exists, it is possible to prevent the MSC/SGSN 101 from being confused by the transmission of the acknowledge signal from an RNC in an area to which the PAGING signal is not transmitted.

FIG. 7 is a timing chart for describing a communication controlling method for the RNC 102 according to the present embodiment executing a receiving operation. In accordance with the timing chart illustrated in FIG. 7, the MSC/SGSN 101 firstly transmits a PAGING signal to the RNC 102 and the RNC 103. The RNC 102 and the RNC 103 each receive the PAGING signal, and transmit the PAGING signal to the mobile telephone 106.

The mobile telephone 106 receives the PAGING signal transmitted from the RNC 102 and the RNC 103, respectively. Then, since the mobile telephone 106 exists in a communication area managed by the RNC 102, the mobile telephone 106 transmits the connection request signal to the RNC 102. The RNC 102 that has received the connection request signal, if the received signal includes an HSUPA communication request, searches for an RNC that is to be a transfer destination in the same fashion as the originating operation.

That is to say, whether or not the connection request signal includes the HSUPA communication request is discriminated (S701). As a result of this discrimination, if the HSUPA communication is not requested (S701: No), the RNC 102 sets up an R99 line with the mobile telephone 106 (S704).

At step S701, if it is discriminated that the connection request is a request for the HSUPA communication (S701: Yes), the RNC 102 searches for an RNC that is to be a transfer destination of the connection request, since the RNC 102 does not have the HSUPA functionality therein (S702). As a result of search, if there is no RNC that is to be a transfer destination (S703: No), the R99 line is set up with the mobile telephone 106 (S704).

In addition, if the RNC 103 is to be a transfer destination (S703: Yes), the RNC 102 transfers to the RNC 103 the connection request signal including the destination information of the RNC 102, which is a transfer source. The RNC 103 receives the transferred signal and extracts the destination information of the RNC 102 included in the signal (S705)

As described heretofore, a communication controller and a communication controlling method according to the present embodiment, if an RNC is requested to provide a service such as HSUPA that the RNC cannot provide, the RNC is capable of identifying another RNC that can provide the requested service based upon information associating the requested service and another RNC that can provide the service. In addition, the RNC is capable of transferring the request for the service to the identified another RNC, thereby allowing the RNC to provide the requested service by use of the functionality of another RNC, even if the RNC is requested to provide the service that the RNC cannot provide.

Accordingly, even if there are variations in the RNC functionalities included in a communication system, a communication controller and a communication controlling method are provided to make the services of the functionalities broadly available to the entire of the system according to the present embodiment.

INDUSTRIAL APPLICABILITY

The present invention is applicable to a system in which multiple communication controllers operate in cooperation to control a communication terminal device. In addition, the present invention is particularly suited for a system that employs a subscriber line extension method for controlling the communication terminal device, while one communication controller is remotely operating another communication controller.

The invention claimed is:

1. A communication controller that operates in cooperation with a plurality of communication controllers and that controls a movable communication terminal device, the communication controller comprising:
   a service request receiving unit for receiving a request for provision of a service via communication with another device, and determining whether or not the communication controller has functionality of providing the requested service;
   a service providing device information storing unit for storing information that associates a service that can be requested by the service request receiving unit and another communication controller that can provide the service;
   a service available device identifying unit for, when the service request receiving unit determines that the communication controller does not include the functionality of providing the requested service, identifying one of the plurality of communication controllers that can provide the requested service, based upon the information stored in the service providing device information storing unit; and
   a request transferring unit for determining one of the plurality of communication controllers that has been identified by the service available device identifying unit to be a transfer destination of the request for the provision of the service that has been received by the service request receiving unit;
   wherein when an instruction of receiving a call for the provision of the service to be controlled by a network side is given to the plurality of communication controllers in a communication range where the communication controller exist, the request transferring unit transfers the request for the provision of the service to one of the plurality of communication controllers that controls an incoming-call call up area identical to that of the communication controller out of the plurality of the communication controllers.

2. The communication controller according to claim 1, wherein when the communication controller makes the request for the provision of the service to the service request receiving unit by requesting start of the communication, the service request receiving unit determines a type of the service that has been requested, based upon information included in a signal that requests the start of the communication.

3. The communication controller according to claim 1, further comprising a call setting unit for setting a call in a communication line for the requested service, when the request for the provision of the service is transferred from one of the plurality of communication controllers.

4. A communication controlling method to be performed by a communication controller that operates in cooperation with a plurality of communication controllers and that controls a movable communication terminal device, the communication controlling method comprising:
   receiving a request for provision of a service via communication with another device, and determining whether or not the communication controller has functionality of providing the requested service;
   storing information that associates a service that can be requested by the receiving step and another communication controller that can provide the service;
   when the receiving determines that the communication controller does not include the functionality of providing the requested service, identifying one of the plurality of communication controllers that can provide the requested service, based upon the information stored in the storing step; and
   determining one of the plurality of communication controllers that has been identified to be a transfer destination of the request for the provision of the service that has been received;
   wherein when an instruction of receiving a call for the provision of the service to be controlled by a network side is given to the plurality of communication controllers in a communication range where the communication controller exist, the determining step transfers the request for the provision of the service to one of the plurality of communication controllers that controls an incoming-call call up area identical to that of the communication controller out of the plurality of the communication controllers.

* * * * *